May 30, 1961 R. POWERS 2,986,262
BUNDLE ALIGNING AND SPACING APPARATUS
Filed June 25, 1958 2 Sheets-Sheet 1

INVENTOR.
RICHARD POWERS
BY
ATTORNEYS

INVENTOR.
RICHARD POWERS
BY
Bresser, Smith & Harding
ATTORNEYS

United States Patent Office 2,986,262
Patented May 30, 1961

2,986,262

BUNDLE ALIGNING AND SPACING APPARATUS

Richard Powers, Broomall, Pa., assignor to Bulletin Company, Philadelphia, Pa., a corporation of Pennsylvania Filed June 25, 1958, Ser. No. 744,388

4 Claims. (Cl. 198—29)

This invention relates generally to material conveying equipment and particularly to improved apparatus for automatically aligning and spacing work units moving in a single file.

A principal object of the present invention is to provide a conveyor that is loaded with work units in single file random relation to one another with apparatus for aligning said units transversely of said conveyor prior to discharge of the same from said conveyor.

A further object of the present invention is to provide a conveyor that is loaded with work units in single file random relation to one another with apparatus for discharging said units in single file aligned predetermined spaced relation to one another.

Another principal object of the present invention is to provide an arrangement of apparatus whereby advance of the line of work units may be terminated independently of operation of the conveyor merely by frictional contact of said apparatus with the lead work unit.

Still another object of the present invention is to provide control means for operating the aligning and spacing apparatus in repeating cycles once for each successive work unit irrespective of the initial spacing between the work units.

And still another object of the present invention is to provide control means for operating the aligning and spacing apparatus so as to effect engagement thereof with the lead work unit thereby to arrest the same until the work unit previously discharged by said apparatus is a desired distance in advance of the arrested work unit.

Other objects and advantages of the present invention will appear more fully hereinafter, it being understood that the invention consists substantially in the construction, combination, location and relative arrangement of parts, all as described in the accompanying drawings and as finally pointed out in the appended claims.

Figure 1:
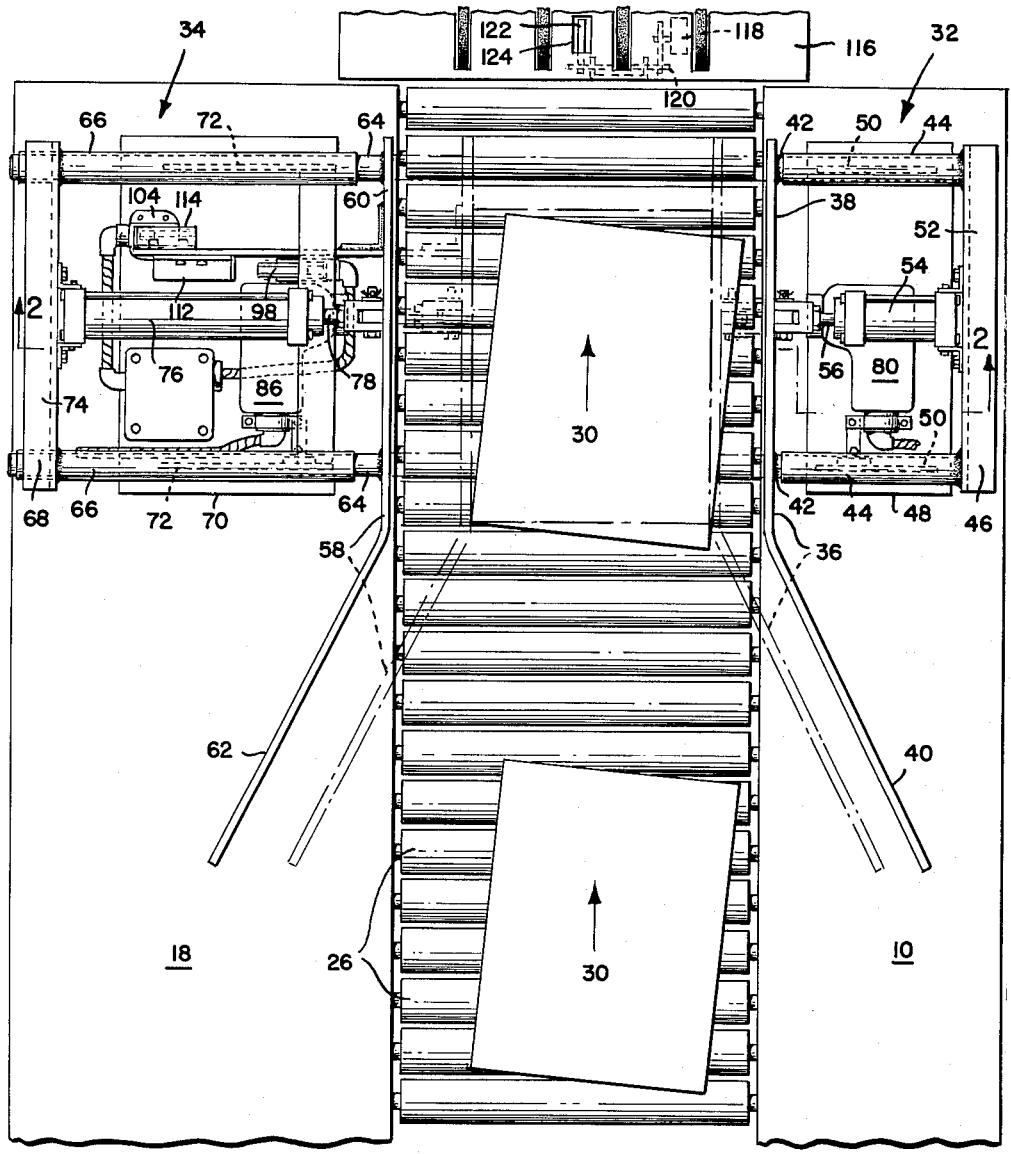
Figure 1 is a plan view of apparatus constructed in accordance with and embodying the principles of the present invention.
Figure 2:
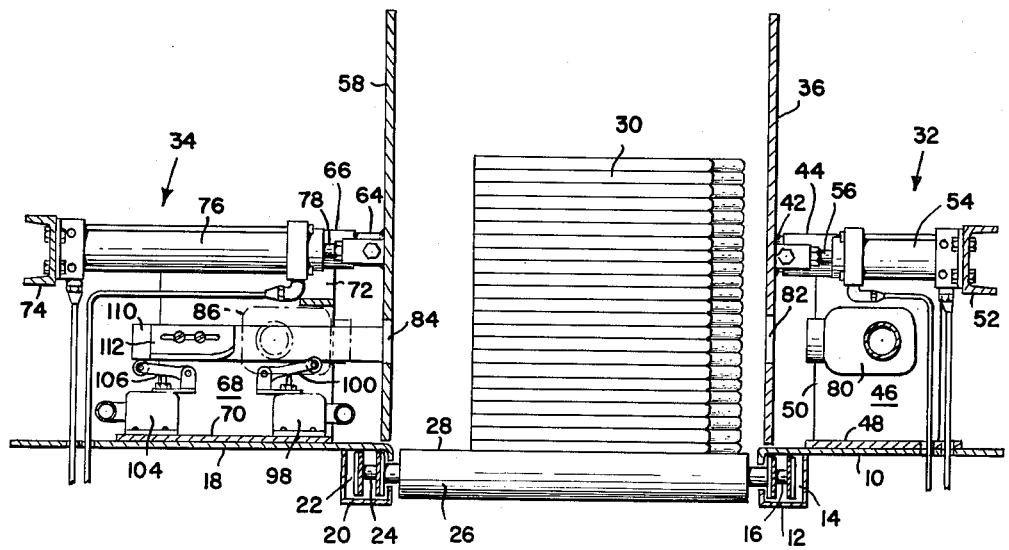
Figure 2 is a vertical section on line 2—2 of Figure 1.

The exemplary apparatus constructed in accordance with and embodying the principles of the present invention comprises a horizontally extending conveyor including a rigid frame structure having upon one side thereof a pair of longitudinally extending plate members 10 and 12 that are arranged to form a channel 14 for accommodating a link chain 16, and upon the other side thereof a pair of longitudinally extending plate members 18 and 20 that are arranged to form a channel 22 for accommodating a link chain 24. Carried by the link chains 16 and 24 are a series of freely revoluble rollers 26 arranged to afford a horizontally extending work unit supporting surface 28. This conveyor is conventional in construction and operation, and therefore a more detailed description thereof is believed to be unnecessary for a full understanding of the present invention.

Work units, for example, bundles of newspapers, designated 30, are loaded directly upon the rollers 26 and are carried thereby through an aligning and spacing station at the discharge end of the conveyor for delivery to apparatus for performing an operation upon the bundles, for example, wrapping the same. The conveyor operates continuously to advance the bundles in single file. The rollers 26 do not rotate unless a bundle 30 carried thereby meets with some positive resistance to movement thereof. When this occurs, the rollers 26 rotate as required and pass under the bundes without overcoming the resistance aforesaid.

The aligning and spacing means includes a pair of assemblies generally designated 32 and 34 respectively positioned upon opposite sides of the conveyor at the discharge end thereof. The assembly 32 includes a gate in the form of an upright plate 36 a main body part 38 of which extends parallel to the conveyor and another part 40 of which is turned outwardly at an angle to the conveyor. Fixed to the main body part 38 of the gate 36 and extending outwardly therefrom in laterally spaced parallel relation to one another are a pair of tubular members 42 that are slidably projected respectively into a pair of fixedly mounted tubular members 44.

For fixedly mounting the members 44 there is provided a rigid frame, generally designated 46, which includes a base plate 48 fixed to the plate member 10 and a pair of laterally spaced plate members 50 respectively underlying the tubular members 44 and having the latter fixed thereto. Spanning the members 44 and fixed to the corresponding outer end portions thereof is a rigid member 52.

Interposed between the member 52 of the frame 46 and the main body part 38 of the gate 36 is a fluid pressure motor comprising a cylinder 54 secured to the member 52 and a piston 56 secured to the gate 36. It will be obvious that the motor aforesaid may be operated to move the gate transversely of the conveyor between the full and the broken line positions thereof shown in Figure 1.

The assembly 34 on the opposite side of the conveyor includes gate in the form of an upright plate 58 a main body part 60 of which extends parallel to the conveyor and another part 62 of which is turned outwardly at an angle to the conveyor. Fixed to the main body part 60 of the gate 58 and extending outwardly therefrom in laterally spaced parallel relation to one another are a pair of tubular members 64 that are slidably projected respectively into a pair of fixedly mounted tubular members 66.

For fixedly mounting the members 66 there is provided a rigid frame, generally designated 68, which includes a base plate 70 fixed to the plate member 18 and a pair of laterally spaced plate members 72 respectively underlying the tubular members 66 and having the latter fixed thereto. Spanning the members 66 and fixed to the corresponding outer end portions thereof is a rigid member 74.

Interposed between the member 74 of the frame 68 and the main body part 60 of the gate 58 is a fluid pressure motor comprising a cylinder 76 secured to the member 74 and a piston 78 secured to the gate 58. It will be obvious that the motor aforesaid may be operated to move the gate transversely of the conveyor between the full and the broken line positions thereof shown in Figure 1. It will be noted that the essential difference between the assemblies 32 and 34 is that the stroke of the piston 78 is substantially greater than the stroke of the piston 56, by two to three times, for example.

Mounted upon the frame 46 is a light unit 80 arranged for projecting a beam of light across the conveyor through aligned openings in the gates 36 and 58, respectively designated 82 and 84, to a photoelectric cell and amplifying unit 86 mounted upon the frame 68.

Mounted upon the base plate 70 of the frame 68, close to the inner edge thereof, is a switch 98 provided with an arm 100. Close to the outer edge of the plate 70 is a second switch 104 provided with arm 106. For actuating the switches 98 and 104, the gate 58 mounts a member 110 that carries cam members 112 and 114. When the gate 58 moves inwardly, the cam 114 releases the switch arm 106, permitting the switch 104 to open, and the cam 112 rocks the switch arm 100 to operate the switch 98. When the gate moves outwardly again the cam 112 releases the switch arm 100, permitting the switch arm 98 to open again, and the cam 114 rocks the switch arm 106 to operate the switch 104.

Now referring particularly to Figure 1, the numeral 116 generally designates a conveyor associated with mechanism for wrapping the bundles of newspapers 30. Mounted upon the conveyor 116 is an electric switch 118 that is operated when pivotally mounted means, generally designated 120, is actuated by a bundle 30 passing over and depressing an element 122 projecting upwardly through an opening 124 in the top of the conveyor 116.

Figure 3:
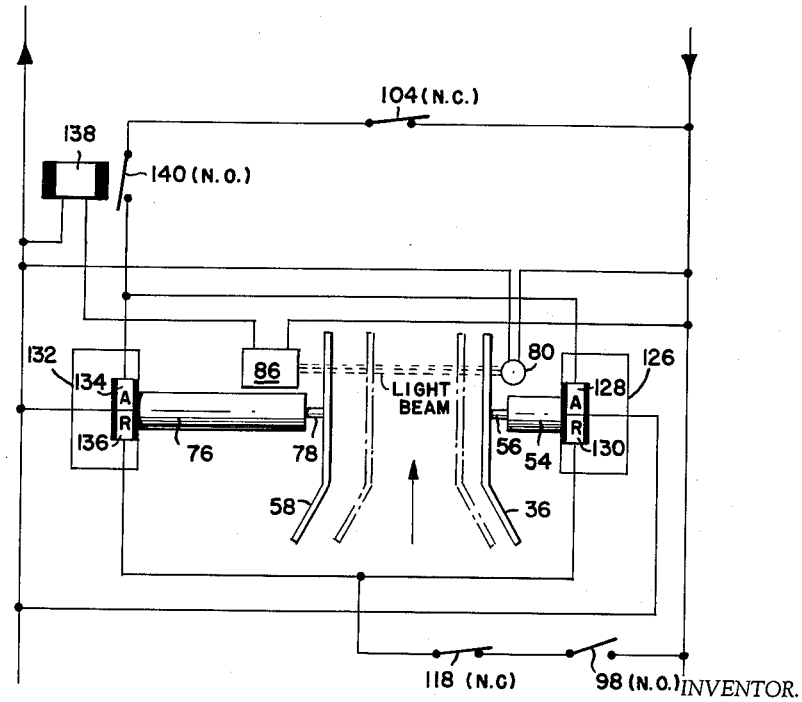
Figure 3 is an electrical wiring diagram showing a simplified form of control circuit for the apparatus of Figure 1.

Now referring particularly to Figure 3, associated with the fluid pressure motor 54—56 is a valve 126 with an advance coil 128 and retract coil 130 for operating the valve 126, and associated with the fluid pressure motor 76—78 is a valve 132 with an advance coil 134 and a retract coil 136 for operating the valve 132. The lamp 80 is suitably connected across a supply of electric power. The photoelectric cell and amplifying unit 86 is connected in series with a relay coil 138 across the power line. The advance coils 128 and 134 are connected in parallel with one another and in series with the contacts of relay 138, designated 140 (normally open) and with the switch 104 (normally closed) across the power line. The retract coils 130 and 136 are connected in parallel with one another and in series with the switch 118 (normally closed) and with the switch 98 (normally open) across the power line.

In the operation of the apparatus, assuming that the light beam is uninterrupted, the advance circuit is open at the relay contacts 140, and the retract circuit is open at the switch 98, in consequence of which the advance coils 128 and 134 and the retract coils 130 and 136 are all deenergized, and the valves 126 and 132 in the pneumatic circuit operate to regulate the supply of pressure to the motors 54—56 and 76—78 so as to hold the gates 36 and 58 motionless, in retracted position, as shown in Figure 1.

When the light beam is interrupted by an advancing bundle 30, the circuit including the relay coil 138 opens, de-energizing the relay coil 138, in consequence of which the relay contacts 140 close, closing the advance circuit. The energized advance coils 128 and 134 operate the valves 126 and 132 thereby to supply the motors 54—56 and 76—78 with pressure for advancing the gates 36 and 58. Shortly after the advance begins, the cam 114 releases the arm 106 of the switch 104 and the latter opens, in consequence of which, for a moment, both the advance and the retract circuits are open, the advance circuit being open at the switch 104 and the retract circuit being open at the switch 98. As the gate 58 reaches the limit of its traverse, the cam 112 engages the arm 100 of the switch 98 and the latter closes, closing the retract circuit.

The energized retract coils 130 and 136 operate the valves 126 and 132 thereby to supply the motors 54—56 and 76—78 with pressure for retracting the gates 36 and 58. Shortly after retraction begins, the cam 112 releases the arm 100 of the switch 98 and the latter opens, opening the retract circuit and de-energizing the retract coils 130 and 136. Therefore, once again for a moment, both the advance and the retract circuits are open, the advance circuit being open at the switch 104, and the retract circuit being open at the switch 98. As the gate 58 reaches the limit of its traverse, the cam 114 engages the arm 106 of the switch 104, and the latter closes, closing the advance circuit again to thereby initiate the next aligning and spacing cycle of the apparatus. If the light beam is uninterrupted, the relay coil 138 is energized and holds the contacts 140 and the advance circuit open until the light beam is interrupted by a bundle 30, whereupon the next cycle of operation is initiated.

The control circuit operates in repeating cycles, once for each bundle in the moving line thereof, to effect engagement of the gates 36 and 58 with the lead bundle, i.e., the bundle about to be discharged from the conveyor. Preferably, the gate 36 engages the opposed side of the lead bundle, then, after a short delay, the gate 58 engages the opposite side of the lead bundle. The gates coact to locate the bundle in a desired position transversely of the conveyor, and to turn the same so that it is aligned parallel to the line of movement. It will be understood that the arrangement is such that the gate 36 is fully extended each time the apparatus operates, thereby to position the opposed sides of successive bundles on exactly the same longitudinally extending line, and it will also be understood that whether or not the gate 58 is fully extended during a given cycle depends upon the size of the bundle passing between the gates 36 and 58. By reason of the freely revolving rollers 26 of the conveyor, only slight resistance, induced by frictional contact of the gates 36 and 58 with the opposite sides of the bundle is sufficient to arrest the same and all the bundles that may be to the rear and crowding up to the same.

The gates 36 and 58 retract at the same time and release the leading bundle, whereupon the latter advances and is discharged onto the conveyor 116. The bundle thus discharged passes over and depresses the member 122, whereupon the switch 118 and the retract circuit open. When the bundle aforesaid is sufficiently advanced for releasing the member 122, the switch 118 and the retract circuit close. Thus each successive lead bundle is released only when the previously discharged bundle is spaced a desired distance therefrom.

It will be understood, of course, that the present invention, as hereinbefore described and as shown in the accompanying drawings, is susceptible to various changes and modifications which may be made from time to time without departing from the general principles or real spirit of the invention. For example, the switch 118 may be omitted and the apparatus utilized to move the bundles 30 transversely of the conveyor as required to align the same, without also spacing the same. Accordingly, it is intended to claim the present invention broadly, as well as specifically, as indicated by the appended claims.

I claim:

1. In work aligning and spacing apparatus, the combination comprising conveyor means for moving a series of work units in single file to and through a work aligning and spacing station, and work aligning and spacing means for arranging said work units in a predetermined manner upon said conveyor means as said work units pass successively through said station including gate means for engaging said work units respectively upon opposite sides thereof, cylinder and piston fluid motor means one of said motor means having a stroke substantially shorter than that of the other for fully extending the associated gate means before the other gate means is fully extended, for reciprocating said gate means, and means connected in electric circuit for automatically operating said motor means and thereby actuating said gate means in repeating cycles, while said conveyor is in operation, for locating the work unit in a predetermined position on said conveyor means, and for simultaneously arresting said work unit for a period of time sufficient for spacing the same predetermined minimum distance from the next preceding work unit.

2. In work aligning apparatus, the combination comprising conveyor means for moving a series of work units in single file to and through a work aligning station, and work aligning means for arranging said work units in a predetermined manner upon said conveyor means as said work units pass successively through said station including gate means for engaging said work units respectively upon opposite sides thereof, cylinder and piston fluid motor means for reciprocating said gate means, one of said motor means having a stroke substantially shorter than that of the other for fully extending the associated gate means before the other gate means is fully extended, and means connected in electric circuit for automatically operating said motor means and thereby actuating said gate means in repeating cycles, while said conveyor is in operation, for locating the work unit in a predetermined position on said conveyor means.

3. Apparatus as defined in claim 2 wherein the gate means actuated by the motor means having the shorter stroke is extended in each cycle to the same position so as to position corresponding sides of successive bundles on the same line extending longitudinally on one side of the conveyor.

4. In work aligning apparatus, the combination comprising conveyor means for moving a series of work units in single file to and through a work aligning station, and work aligning means for arranging said work units in a predetermined manner upon said conveyor means as said work units pass successively through said station including gate means disposed respectively upon opposite sides of said conveyor means, means for reciprocating said gates in a direction transverse to the line of movement of said work units for engaging the latter respectively upon opposite sides thereof, one of said gate reciprocating means having a stroke substantially shorter than that of the other for fully extending the associated gate means before the other gate means is fully extended, and means connected in electric circuit for automatically operating said gate reciprocating means and thereby actuating said gate means in repeating cycles, while said conveyor is in operation, for locating the work unit in a predetermined position on said conveyor.

References Cited in the file of this patent

UNITED STATES PATENTS

| | | |
|---|---|---|
| 439,078 | Maddock | Oct. 21, 1890 |
| 2,602,554 | Griffith | July 8, 1952 |
| 2,641,371 | Webster | June 9, 1953 |
| 2,723,393 | Verrinder | Nov. 15, 1955 |
| 2,815,111 | Capps | Dec. 3, 1957 |
| 2,818,156 | Edwards | Dec. 31, 1957 |
| 2,829,762 | Oswald | Apr. 8, 1958 |
| 2,894,262 | Schafroth | July 14, 1959 |